No. 655,010. Patented July 31, 1900.
W. REECK.
STEP FRAME FOR CARRIAGE BOX SEATS.
(Application filed Dec. 7, 1899.)
(No Model.)
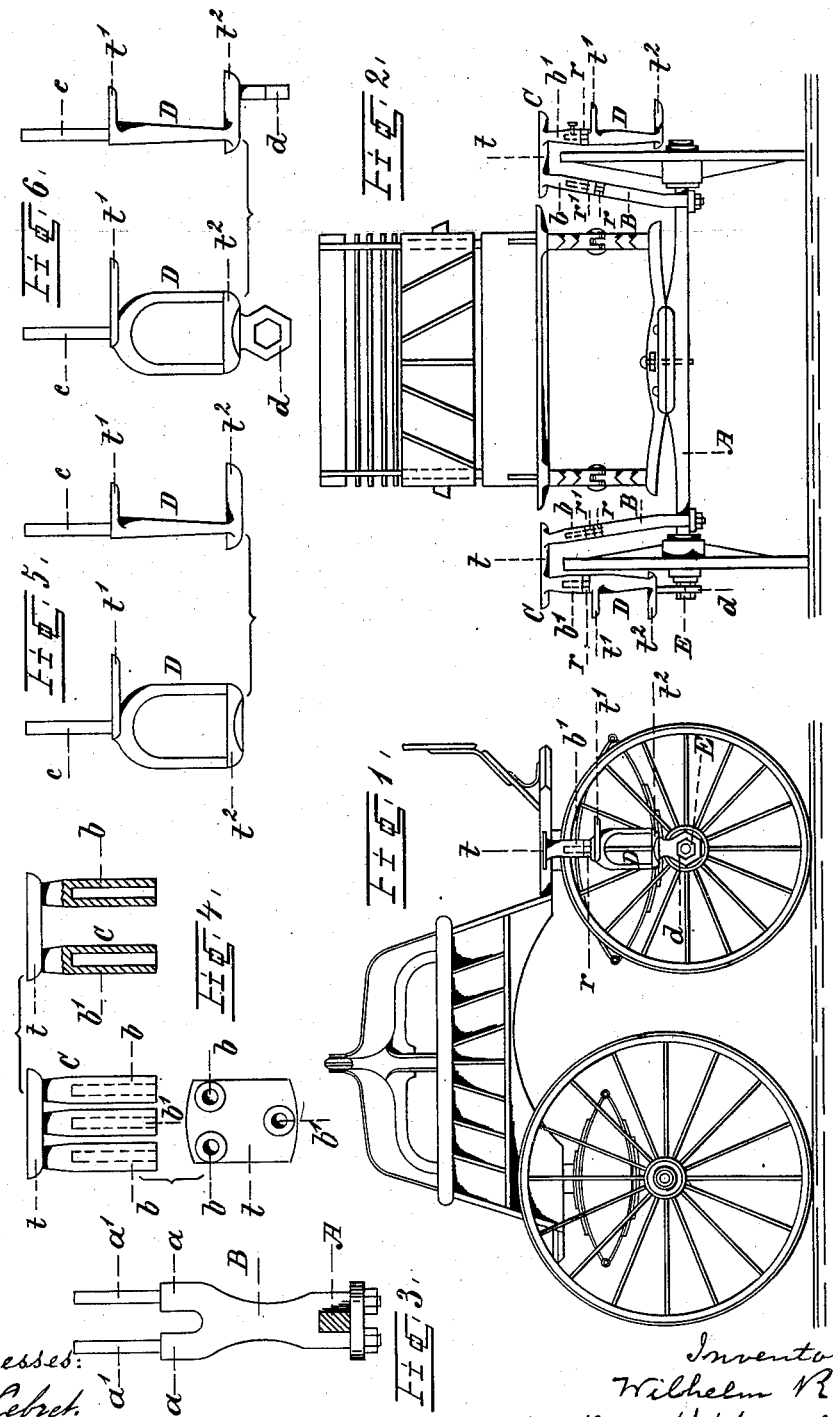
Witnesses:
J. C. Lebret.
A. Witt.
Inventor:
Wilhelm Reeck,
By H. H. de Vos.
Attorney.
THE NORRIS PETERS CO., PHOTO-LITHO., WASHINGTON, D. C.

UNITED STATES PATENT OFFICE.

WILHELM REECK, OF CÖSLIN, GERMANY.

STEP-FRAME FOR CARRIAGE BOX-SEATS.

SPECIFICATION forming part of Letters Patent No. 655,010, dated July 31, 1900.

Application filed December 7, 1899. Serial No. 739,483. (No model.)

*To all whom it may concern:*

Be it known that I, WILHELM REECK, carriage-builder, a subject of the German Emperor, residing at Cöslin, Prussia, German Empire, have invented certain new and useful Improvements in Step-Frames for Carriage Box-Seats; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to carriages and similar road-vehicles, more particularly to four-wheeled vehicles; and it consists in an improved arrangement or construction of a step-frame for ascending the driver's or box seat at the front wheel. Ordinarily either no steps are used or only one step, the person ascending the box-seat stepping upon the wheel-nave, the step, and the tire, which is inconvenient, especially when the roads are dirty, and often causes accidents if the horses start during the mounting. These inconveniences are obviated by the improved step-frame, which can be applied both to new and to existing carriages and is so arranged that the part above the top and in front of the wheel can be readily removed when the wheel is to be taken off.

On the drawings appended hereunto, Figures 1 and 2 represent a dog-cart fitted with the improved arrangement of step-frame, and Figs. 3 to 6 represent details of the same.

The improved step-frame consists of a fork-shaped frame composed of a strut fixed upon the front-wheel axle at the back of the wheel, a tread extending over the top of the wheel, and a step-carrier hanging from the tread in front of the wheel and fitted with steps. It is made in two or more pieces connected together, so that the tread and step-carrier can be readily removed. Preferably it is constructed in the manner shown on the drawings of three parts B, C, and D and hereinafter described.

Upon the axle A a strut B is fixed, which at its upper end is forked into two parts $a\, a$, Fig. 3, which terminate in pins $a'\, a'$. Upon these the two tubular back legs $b\, b$ of a three-legged stool C, Figs. 2 and 4, are pushed, the top of which forms a tread $t$, extending across the wheel in such a manner that the wheel can turn freely between the said legs $b\, b$, and the third leg $b'$ hangs down in front of it. Into this hollow leg $b'$ the stirrup-shaped step-carrier D is inserted with its upper pin $c$, Figs. 1, 2, and 5, which carrier is formed at its lower end with the step $t^2$ and in its middle part with the lateral step $t'$.

The parts C and D are connected by means of a set-screw or other suitable means.

In order to enable the step-frame to be manufactured wholesale and suitable for all sizes of wheels, the pins $a'$ and $c$ and the tubular sockets for them are made of such length that distance rings or washers $r\, r'$ can be placed upon the pins. By using more or less of such washers the distance between the tread $t$ and the axle and step $t^2$ can be varied, so that the wheel can in all cases turn clear of the tread $t$.

Where the axle is what is usually called a "patent" axle, a cover on the hub, as shown on the right hand of Fig. 2, the rings $r'$ are preferably made of elastic material, such as india-rubber. In consequence of this arrangement the lowest part $t^2$ rests on the wheel-hub—that is to say, a fixed support—when a person mounts, and the danger of the step-frame becoming bent by the one-sided load is obviated. The person mounting over the front wheel thus finds a stationary, firm, and broad tread $t^2$, and even if the horses start during the mounting the support of the foot is not influenced thereby.

When the carriage has an ordinary axle arranged for taking off the wheel to grease it, the improved step-frame offers a convenient means for preventing the axle-nuts from becoming detached. For this purpose a lug $d$ is forged or fixed on the step $t^2$, having an opening shaped to fit the nut, which when pushed over the same renders a turning of the nut impossible. Thereby the detachment or loss of these nuts is prevented in the simplest manner. The lug may be open at the bottom and shaped like the jaw of a screw-key.

The top tread $t$ forms a mud-guard for the front wheel and may for this purpose be extended on both sides around the wheel in order to increase its effect.

The strut B may be fixed to the axle A in the manner shown by Figs. 2 and 3 or in any other convenient way to suit the front axle and carriage.

Instead of the tread $t^2$ having tubular legs these may be solid and the parts B and D formed with tubes instead of pins, or equivalent sliding parts may be used.

The improved step-frame offers the following advantages: first, absence of danger in mounting the box-seat even while driving; second, the necessity of using this step under all circumstances, which prevents the mounting or descending out of recklessness or intention in the usual dangerous way; third, a saving of clothing, as this will not come as easily into contact with the dusty or dirty wheel-tire as with the usual arrangement; fourth, a mud-guard for the front wheels formed by the top tread, and, fifth, the securing of the nuts on the wheel-axle where these are not inclosed.

Having described my invention, what I claim is—

1. A step-frame for carriages consisting of a forked frame embracing the wheel, one leg of which frame forms a strut fixed to the wheel-axle while the outer leg and the top are detachably pushed upon said strut, the outer leg being provided with steps, substantially as shown and described and for the purpose specified.

2. A step-frame for carriages consisting of a forked frame embracing the wheel, one leg of which frame forms a strut fixed to the wheel-axle while the outer leg and the top are detachably pushed upon said strut and supported at the lower end by the outer end of the wheel-axle, substantially as shown and described and for the purpose specified.

3. The combination with a vehicle of a forked frame secured at one end to the wheel-axle within the wheel, thence extending up, outward and then downward outside of the wheel, the outer leg of the frame being provided with steps, and the top where the two legs join forming a broad top step, substantially as shown and described.

In witness whereof I have hereunto set my hand in presence of two witnesses.

WILHELM REECK.

Witnesses:
HANS GRAISER,
FRANZ TERPE.